UNITED STATES PATENT OFFICE.

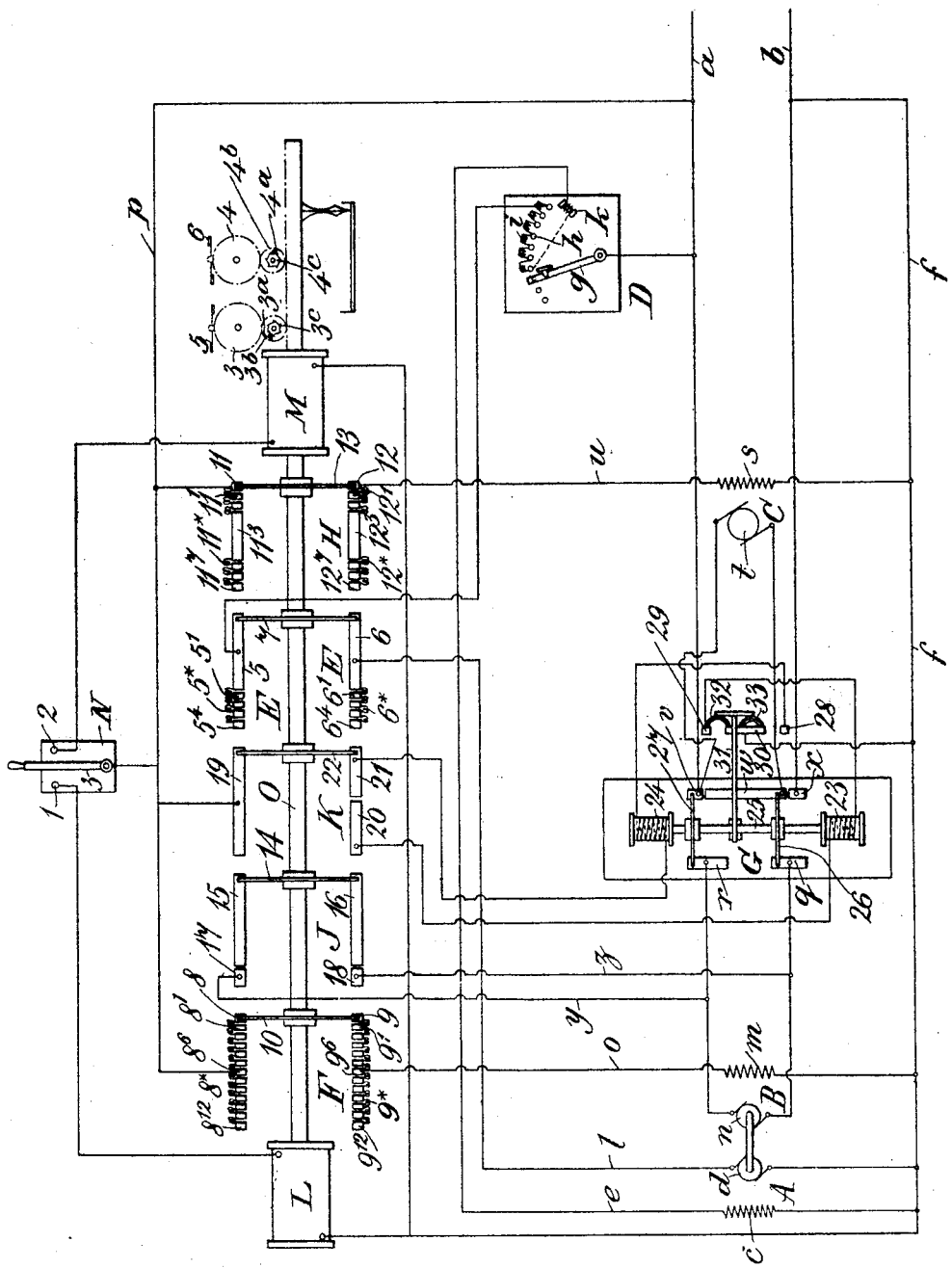

WILLIAM GEIPEL AND FREDERICK MONTAGUE TOWNSHEND LANGE, OF LONDON, AND GEORGE WILLIAM MASCORD, OF BARNES, ENGLAND.

CONTROLLING ELECTRIC MOTORS.

No. 797,889. Specification of Letters Patent. Patented Aug. 22, 1905.

Application filed November 28, 1904. Serial No. 234,675.

*To all whom it may concern:*

Be it known that we, WILLIAM GEIPEL and FREDERICK MONTAGUE TOWNSHEND LANGE, residing at London, and GEORGE WILLIAM MASCORD, residing at Barnes, in the county of Surrey, England, subjects of the King of Great Britain and Ireland, have invented Improvements in and Relating to Controlling Electric Motors, of which the following is a specification.

This invention relates to the control of shunt-wound electric motors that are required to run at different speeds—as, for example, in the driving of printing-machines, electric lifts, and railway, tramway, and like vehicles. The speed of such motors can be varied either by varying the voltage of the current applied to the armature or by varying the strength of the motor-field. The voltage applied to the armature may be varied either by means of a rheostat in series with the armature, which, however, is wasteful, or, as described in the specification of British Letters Patent No. 14,509 of 1891, by varying the electromotive force of the generator side of a motor-generator that supplies the armature of the motor to be controlled with current. This latter method is open to the objections that the generator must be at least equal to if not rather larger than the motor to be controlled and that the losses in the motor-generator become very serious as full speed of the motor to be controlled is approached.

Now instead of, as described in the before-mentioned specification, having the armatures of the motor to be controlled and the generator so connected together that the armature of the motor to be controlled is supplied with current by the generator during the whole time that the motor is running the two armatures are connected thus only when the motor is being started up from rest and until it reaches a speed that corresponds to half-voltage. When this speed is attained, the armatures of the generator and the motor are connected across the source of supply in suchwise that the generator opposes the flow of current through the armature of the motor, and since the generator is giving half the electromotive force of the line only half the electromotive force of the line is impressed upon the motor. To increase the speed of the motor up to full speed, the electromotive force of the generator, which is now working as a negative booster, is gradually reduced until the motor receives the full electromotive force of the line. The reduction of the electromotive force of the generator may be effected by weakening its field or by reducing the speed of its armature.

For operating as described the armature of the generator is wound so as to generate at a pressure equal to half that employed with the motor to be controlled.

For the purpose of obviating loss of energy with the motor running at full speed in consequence of the passage of current through the armature of the generator the armature of the generator is short-circuited when the motor has been nearly run up to speed, so that the motor will be supplied with current direct from the source of supply, an automatic or other switch and connections being provided for producing the required short circuit, or the generator may be slowed down or stopped.

The accompanying drawing is a diagram of the connections of a controller for use in controlling electric motors according to this invention.

$a$ and $b$ are leads that are in connection with a source of power of constant potential.

A, B, and C are respectively the motor of the motor-generator, the generator of the motor-generator, and the motor to be controlled.

$c$ is the field-winding, and $d$ the armature of the motor A. The field-winding $c$ is connected on one side to the lead $a$ by means of a lead $e$ and through a suitable motor-starting switch D and, on the other hand, to the lead $b$ by a common lead $f$. The motor-starting switch D illustrated is one that is suitable for the purpose in view; but of course it will be understood that any suitable type of motor-starting switch may be employed. The motor-starting switch D comprises a switch-handle $g$, connected to the lead $a$ and moving over contacts $h$, that control resistance-coils $i$.

$k$ is an electromagnet whose winding is in series with the lead $e$ and is connected to one of the contacts $h$. The armature $d$ is connected on one side to the lead $b$ through the common lead $f$ and at the other side to the lead $a$ through a lead $l$, a rheostatic device E, and switch D. The arrangement is such that when the switch-handle $g$ is moved onto the contacts $h$ the field-circuit of the motor A will be closed directly and the armature-circuit through the resistance-coils $i$, which latter will be cut out of the armature-circuit and inserted in the field-circuit as the handle $g$ is moved toward the electromagnet $k$. The electromagnet $k$ tends to hold the switch closed.

$m$ is the field-winding, and $n$ the armature of the generator B. The field-winding $m$ is connected on one side to the lead $a$ through a lead, rheostatic device F, and lead $p$ and on the other side to the lead $b$ through the common lead $f$. The brushes of the armature $n$ are connected to contact-plates $q$ and $r$ of a change-over switch G.

$s$ is the field-winding, and $t$ the armature of the motor C to be controlled. The field-winding $s$ is connected at one side to the lead $b$ through the common lead $f$ and on the other side to the lead $a$ through a lead $u$, rheostatic device H, and the common lead $p$. The armature $t$ is connected to contact-plates $v$ and $w$ of the change-over switch G. The contact-plate $v$ is also connected to the lead $a$, and $x$ is a contact-plate in connection with the lead $b$.

J is a device for short-circuiting the armature $n$ and is connected thereto through leads $y$ $z$, which must have a large cross-sectional area—i. e., low resistance.

K is a device for operating the change-over switch G.

L and M are solenoids, the windings of each of which are connected at one end to the lead $f$ and at the other end are connected to a terminal 1 or 2 of a switch N. The switch N has a handle 3, that is electrically connected to the common lead $p$ and serves to make contact with one or other of the contacts 1 2. Extending within the two solenoids L M is an iron rod O, that carries a number of contact-brushes arranged as hereinafter described. This iron rod is influenced by the solenoids L M and is moved endwise thereby in one direction or the other, according to which of the solenoids is excited. Geared to the rod O are devices that are adapted to adjust the rate of movement of the rod O. In the arrangement now being described there are two sets of mechanism 3 4 for this purpose, and each set of mechanism is provided with means, such as a fan 5 or 6, that offers more or less resistance to rotation. Each set of mechanism is operative only in one direction of movement of the rod O—that is to say, the mechanism 3 is operative when the rod is moved to the left and the mechanism 4 when the rod is moved to the right. The fans 5 and 6 are so arranged that the fan 5 offers a greater resistance to rotation than does the fan 6, with the result that movement of the rod O to the left when starting up motor C is slower than is its movement to the right when slowing down or stopping the motor C. The connection of the sets of mechanism 3 4 with the rod O is by means of a ratchet-and-pawl device, a pawl $3^a$ $4^a$ being carried by a pinion $3^b$ or $4^b$, that gears with the rod O, and engaging a ratchet-wheel $3^c$ $4^c$. It will, however, be obvious that only one set of mechanism may be employed, in which case the rate of movement of the rod O in either direction would be the same, or the fan when only one set of mechanism is employed may be arranged to offer more resistance when rotated in one direction than when rotated in the other direction.

The rheostatic device E comprises two contacts made up of a number of contact-blocks 5, 5', to $5^4$ and 6, 6', to $6^4$, the contact-blocks 5 and 6 being of great length as compared with the length of the other blocks. These contacts are spanned by a brush 7, carried by the rod O. The contact-block 5 is connected to the starting-switch D and the contact-block 6 to one pole of the armature $d$. The several blocks of each contact are connected together by means of resistance-coils $5^\times$ $6^\times$.

The rheostatic device F comprises two contacts made up of a number of contact-blocks 8, 8', to $8^{12}$ and 9, 9', to $9^{12}$, the several contact-blocks of each contact being connected together by means of resistance-coils $8^\times$ and $9^\times$. The contacts are spanned by a brush 10, carried by the rod O. The lead $p$ is connected to contact-block $8^6$, and contact-block $9^6$ is connected to field-windings $m$ through the lead $o$.

The rheostatic device H comprises two contacts made up of a number of contact-blocks 11, 11', to $11^7$ and 12, 12', to $12^7$, the several contact-blocks of each contact being connected together by resistance-coils $11^\times$ $12^\times$. The contacts are spanned by a brush 13, carried by the rod O. The lead $p$ is connected to the contact-block 11, and contact 12 is connected to the field-winding $s$ through the lead $u$. The contact-blocks $11^3$ $12^3$ are of great length as compared with the other contact-blocks of this rheostatic device.

The short-circuiting device J comprises a brush 14, that is carried by the rod O and spans either two insulating-blocks 15 16 or two contacts 17 18, connected through the leads $y$ $z$ to the armature $n$. The insulating-blocks 15 16 are of such a length that the brush 14 will be in contact therewith for nearly the whole of the travel of the rod O.

The change-over switch-operating device K comprises three contacts 19 20 21, of which 19 is connected to the lead $p$ and 20 and 21 are connected, respectively, with one end of the windings of solenoids 23 24 of the switch G. The contacts 19 20 21 are spanned by a brush 22. The other ends of the windings of the solenoids 23 24 are connected, respectively, with contact-blocks 29 28. 30 is a contact-block that is connected to the lead $f$.

Extending within the solenoids 23 24 is an iron rod 25, that carries brushes 26 27. The brush 27 is arranged to span the contacts $r$, $v$, and $w$, and the brush 26 is arranged to span the contacts $q$, $x$, and $w$. 31 is a bar connected to the rod 25 and carrying two brushes 32 33, which are each arranged to span two of the contacts 30 and 28 and 30 and 29 in such manner that only two of the contacts 28, 29, and 30 will be connected together at the same time.

The method of operation is as follows: Assuming the parts to be in the position shown—that is to say, with the brushes on the rod O at the extreme right of the several devices they control and the armature $n$ of the generator B directly connected to the armature $t$ of the motor C—a main switch in the leads $a$ $b$ is first closed and then the switch D is closed. The several circuits of the motor A, generator B, and motor C thus being closed, the motor A drives the generator B, and the latter is ready to supply current to the armature $t$ of the motor C. When it is desired to start the motor C, the handle 3 of the switch N is moved to the left and onto contact 1. This causes the solenoid L to be excited, the rod O to be acted upon and drawn within the solenoid. As before explained, the rate of movement of the rod is controlled during its movement toward the left by means of the mechanism 3. As the rod O moves toward the left the brush 10 moves over the contact-blocks 8, 8', to $8^6$ and 9, 9', to $9^6$ and resistance is cut out of the circuit of the field-windings $m$ of the generator B. The excitation of the field therefore becomes greater and a gradually-increasing electromotive force is generated. The motor C is thus started gradually. Resistance is as the rod O moves toward the left gradually inserted in the circuit of the field-windings $s$ of the motor C by the traversing of the brush 13 over the contact-blocks of the rheostatic device H. By this means the field of the motor C, which at starting may in some cases be arranged to have extra strength for the purpose of exciting an extra torque at starting, is gradually reduced to normal. While the brush 13 is traversing the contacts $11^3$ $12^3$ the field of the motor C is maintained constant. When the rod O has completed such part of its travel as has been prearranged, in the example now being described about one-half thereof, the brush 22 of the device K moves from off the contact 21 onto the contact 20, thereby causing current to flow through the solenoid 23, contact 29, brush 32, and contact 30 to the lead $f$. The solenoid 23 is excited, and the excitation thereof causes the rod 25 to be drawn down. This movement of the rod 25 moves the brushes 32 33 from the position shown to a position in which the brush 33 bridges the contacts 28 30. The circuit of the solenoid 23 is thus broken and the solenoid 24 so connected up as to be in circuit when the brush 22 moves onto the contact 21 and ready to move the rod 25 upward. At the same time that the operation just described takes place the brushes 27 26 are moved from the position shown into a position in which the brush 27 spans the contacts $r$ and $w$ and the brush 26 spans the contacts $q$ and $x$. This movement of the brushes 26 27 connects the armatures $t$ and $n$ in opposition across the leads $a$ $b$, the armature $n$ acting to oppose the flow of current through the armature $t$. When this stage is reached, the brush 10 spans the contact-blocks $8^6$ $9^6$ of the rheostatic device F and all resistance is cut out of the circuit of the field-winding $m$. Further movement of the rod O to the left causes the insertion of resistance by means of the rheostatic device F in the circuit of the field-windings $m$, with the consequence that the field of the generator B becomes weaker and the electromotive force generated less. The generator B thus offers a gradually-decreasing resistance to the passage of current from the leads $a$ $b$ to the armature $t$ of the motor C. When the connections of the armatures $n$ and $t$ have been changed over, as before described, the continued movement of the rod O toward the left causes the brush 7 of the rheostatic device E to pass on to the contact-blocks 5' $5^4$ and 6' $6^4$ and so insert resistance in the armature-circuit of the motor A. At the same time as the speed of the motor A is being reduced the speed of the motor C is being increased. This increase of speed is caused by the insertion of resistance in the field-circuit, such resistance being inserted by the traversing of the brush 13 over the contact-blocks $11^4$ $11^7$ and $12^4$ $12^7$ of the rheostatic device H.

Toward the end of the movement of the rod O the armature $n$ is short-circuited by means of the brush 14 of the device J spanning the contacts 17 18, the armature T of the motor C then receiving its current direct from the leads $a$ $b$.

If the handle 3 be now moved from off the contact 1 onto the contact 2, the solenoid M and mechanism 4 will become operative and the rod O moved toward the right, the various operations hereinbefore described taking place, but in the reverse order. It will be seen that the speed of the motor C can be decreased or increased when desired by movement of the handle 3 onto one or other of the contacts 2 1 and that if the handle 3 be placed centrally the speed will remain constant.

It will be seen that during the process of controlling the motor C from half speed up to full speed a part of the energy applied to the generator B, which is really then working as a motor, is returned to the line through the motor A, which is then being driven and working as a generator. Further, when the motor C is working at full voltage instead of converting the whole of the energy through the generator B there are only such losses as occur in driving the motor-generator itself without generating electromotive force, or the loss may be rendered negligible by slowing down or stopping the motor-generator, as hereinafter mentioned. It will further be seen that the generator B need be only of about one-half or less of the capacity of the main motor.

The field of the generator B is excited, as shown, from the main source; but its excitation is greatest when the change over switch G is about to be operated and least when it is working near zero voltage and maximum voltage.

To still further reduce or prevent loss of energy in the motor A when the armature $n$ of the generator B has been short-circuited, as described, and the motor A has been made to run slowly by the insertion of resistance in its armature-circuit by means of the rheostatic device E, the switch D may be opened, so that the motor A and generator B will be made to stop altogether.

The switch D is shown and described as an ordinary hand-operated motor-starting switch; but it will be obvious that any suitable type of switch may be employed. For instance, the switch employed may be of the automatic type, of which there are many types on the market, and it may be operated by a contact or contacts so arranged on the rod O that the motor A and generator B may be started or stopped automatically, according to the position or positions in which the contact or contacts is or are arranged, or the switch D may be operated partly by hand and partly automatically, as just explained.

The fans 5 6 may be adjusted for any desirable rate or rates of movement and may also be adapted to allow or cause the rate or rates at which the rod O moves in one direction to differ from that or those at which it moves in the opposite direction, for example, so as to produce slow starting and quick stopping.

As will be obvious, other means than those described may be employed to regulate the rate of movement of the rod O. For instance, dash-pots may be employed, or the attractive power of the solenoids may be made greater or less. In some cases we may operate the rod O or its equivalent by hand, thus dispensing with the solenoids L M and switch N.

In the controller illustrated the motor C is shown as capable of exerting an extra torque at starting, the field-windings being inserted in circuit across the leads $a$ $b$ with no resistance in circuit, and the rheostatic device H reducing the field to normal strength as the speed increases.

What we claim is—

1. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the speed of the main motor until it attains a speed corresponding to the electromotive force of the source of electric energy.

2. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the speed of the main motor and reducing the electromotive force of the generator.

3. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the speed of the main motor and reducing the field of the generator and therefore the electromotive force produced thereby.

4. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the speed of the main motor until it attains a speed corresponding to the electromotive force of the source of electric energy.

5. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the speed of the main motor and reducing the electromotive force of the generator.

6. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the speed of the main motor and reducing the field of the generator and therefore the electromotive force produced thereby.

7. The herein-described method of controlling shunt-wound electric motors, which consists in first directly connecting the armatures of the motor to be controlled and of the generator together until the motor has attained a speed that is less than full speed, then connecting the said armatures in opposition across a source of electric energy, gradually reducing the electromotive force of the generator, and finally short-circuiting the generator-armature.

8. The herein-described method of controlling shunt-wound electric motors, which consists in first directly connecting the armatures of the motor to be controlled and of the generator together until the motor has attained a speed that is less than full speed, then connecting the said armatures in opposition across a source of electric energy, gradually reducing the field of the generator and the electromotive force produced, and finally short-circuiting the generator-armature.

9. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually reducing the voltage produced by the generator and finally short-circuiting the generator-armature.

10. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually reducing the field of the generator and the voltage produced and finally short-circuiting the generator-armature.

11. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the electromotive force applied to the motor.

12. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the electromotive force applied to the motor and reducing the electromotive force produced by the generator.

13. The method of controlling shunt-wound electric motors consisting in first directly connecting together the armature of a main motor that is to be controlled and the armature of the generator of a motor-generator and maintaining such connection until the motor has attained a speed that corresponds to the full electromotive force of the generator, then changing the connections of the motor and of the generator and placing them in opposition across a source of electric energy and gradually increasing the electromotive force applied to the motor and reducing the field of the generator and therefore the electromotive force produced thereby.

14. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the electromotive force applied to the motor.

15. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the electromotive force applied to the motor and reducing the electromotive force produced by the generator.

16. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the electromotive force applied to the motor and reducing the field of the generator and therefore the electromotive force produced thereby.

17. The herein-described method of controlling shunt-wound electric motors, which consists in first directly connecting the armatures of the motor to be controlled and of the generator together until the motor has attained a speed that is less than full speed, then connecting the said armatures in opposition across a source of electric energy, gradually increasing the voltage applied to the motor and finally short-circuiting the generator-armature.

18. The herein-described method of controlling shunt-wound electric motors, which consists in first directly connecting the armatures of the motor to be controlled and of the generator together until the motor has attained a speed that is less than full speed, then connecting the said armatures in opposition across a source of electric energy, gradually increasing the voltage applied to the motor, reducing the electromotive force produced by the generator and finally short-circuiting the generator-armature.

19. The herein-described method of controlling shunt-wound electric motors, which consists in first directly connecting the armatures of the motor to be controlled and of the generator together until the motor has attained a speed that is less than full speed, then connecting the said armatures in opposition across a source of electric energy, gradually increasing the voltage applied to the motor, reducing the field of the generator and therefore the electromotive force produced and finally short-circuiting the generator-armature.

20. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually increasing the voltage applied to the motor and finally short-circuiting the generator-armature.

21. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually increasing the voltage applied to the motor, reducing the electromotive force produced by the generator and finally short-circuiting the generator-armature.

22. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually increasing the voltage applied to the motor, reducing the field of the generator and therefore the electromotive force produced and finally short-circuiting the generator-armature.

23. The method of controlling shunt-wound electric motors consisting in first directly connecting together the armature of a main motor that is to be controlled and the armature of the generator of a motor-generator and maintaining such connection until the motor has attained a speed that corresponds to half its full voltage, then changing the connections of the motor and of the generator and placing them in opposition across a source of electric energy and gradually increasing the electromotive force applied to the motor until the motor receives nearly the full electromotive force of the source of electric energy, and finally reducing the field of the motor until full speed is attained.

24. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually reducing the electromotive force produced by the generator until the motor receives nearly the full voltage of the source of energy, short-circuiting the generator-armature and finally reducing the field of the motor until full speed is attained.

25. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually reducing the field of the generator until the motor receives nearly the full voltage of the source of energy, short-circuiting the generator-armature and reducing the field of the motor until full speed is attained.

26. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually increasing the voltage applied to the motor until the motor receives nearly the full voltage of the source of energy, short-circuiting the generator-armature, reducing the field of the motor until full speed is attained and slowing down the speed of the generator.

27. The herein-described method of controlling shunt-wound electric motors, which consists in first directly connecting the armatures of the motor to be controlled and of the generator together until the motor has attained a speed corresponding to half its full voltage, then connecting the said armatures in opposition across a source of electric energy, gradually increasing the voltage applied to the motor until the motor receives nearly the full voltage of the source of energy, short-circuiting the generator-armature, reducing the field of the motor until full speed is attained and stopping the generator.

Signed at the United States consulate-general, London, England, this 3d day of November, 1904.

WILLIAM GEIPEL.
FREDERICK MONTAGUE TOWNSHEND LANGE.
GEORGE WILLIAM MASCORD.

Witnesses:
    A. D. JAMESON,
    F. L. RAND.